United States Patent [19]

Klieves

[11] 4,178,954
[45] Dec. 18, 1979

[54] DIAPHRAGM VALVE AND VALVE SYSTEM

[76] Inventor: Hal Klieves, 2830 NE. 29 Ave., Lighthouse Point, Fla. 33064

[21] Appl. No.: 806,354

[22] Filed: Jun. 14, 1977

[51] Int. Cl.² .......................................... F16K 31/363
[52] U.S. Cl. ................................ 137/119; 137/624.14; 137/624.18
[58] Field of Search ............. 137/119, 624.14, 624.18; 239/66

[56] References Cited

U.S. PATENT DOCUMENTS

| | | | |
|---|---|---|---|
| 3,080,881 | 3/1963 | Stilwell et al. | 137/624.14 X |
| 3,307,580 | 3/1967 | Alfieri et al. | 137/624.18 |
| 3,785,391 | 1/1974 | Miller | 137/119 |
| 3,845,777 | 11/1974 | Gilson | 137/119 |

*Primary Examiner*—William R. Cline

*Attorney, Agent, or Firm*—Eugene F. Malin; Barry L. Haley

[57] ABSTRACT

A new and improved automatic diaphragm valve having an inlet and two separate outlets for use in a fluid distribution system. The valve cycle automatically opens both outlets when fluid stops flowing into the inlet. Each time the fluid starts flowing through the inlet the valve automatically and alternately opens one valve outlet and closes the other valve outlet. The valve cycling mechanism is alternately cocked into a positive first and second cocked position in order to open the previously closed valve outlet and to close the previously opened valve outlet during the next half cycle. When this valve is connected at each branching point in a fluid distribution system, the valve will cause cyclic distribution of fluid from the terminal branches of the system in a serial manner.

3 Claims, 16 Drawing Figures

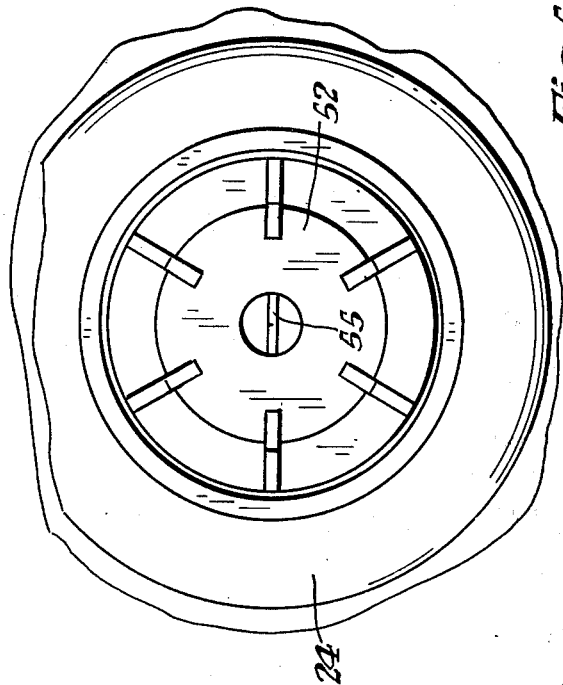
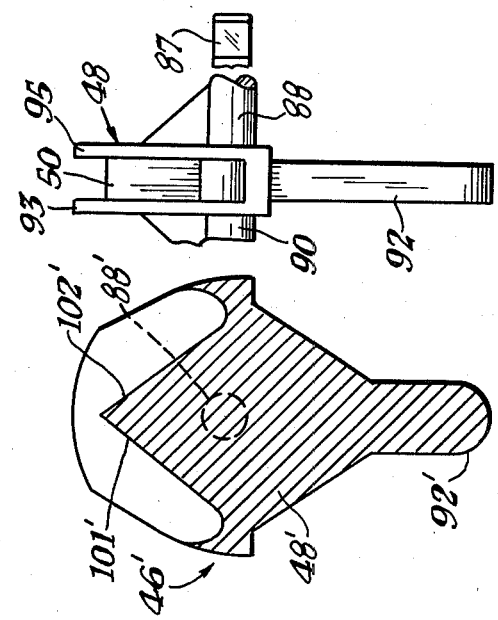
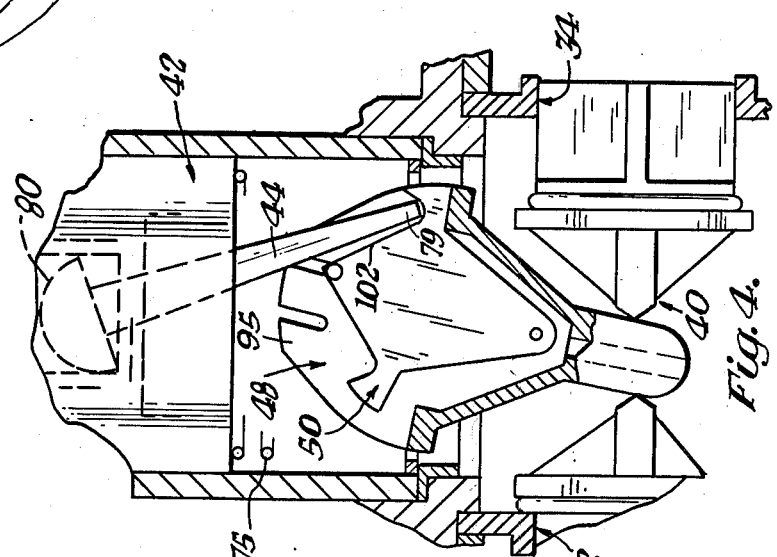
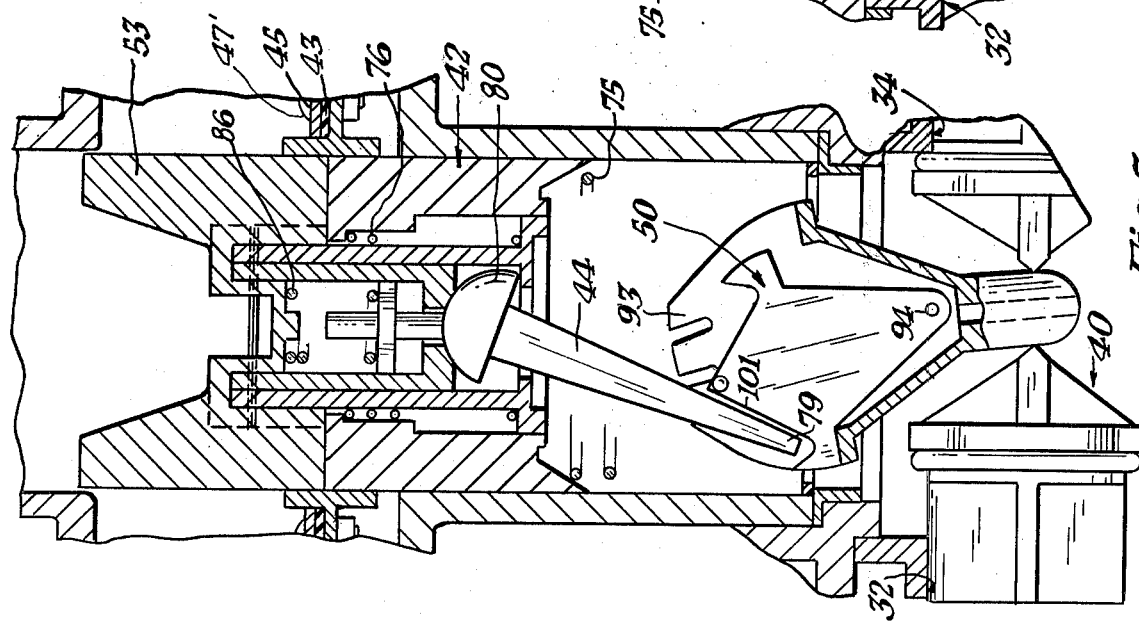

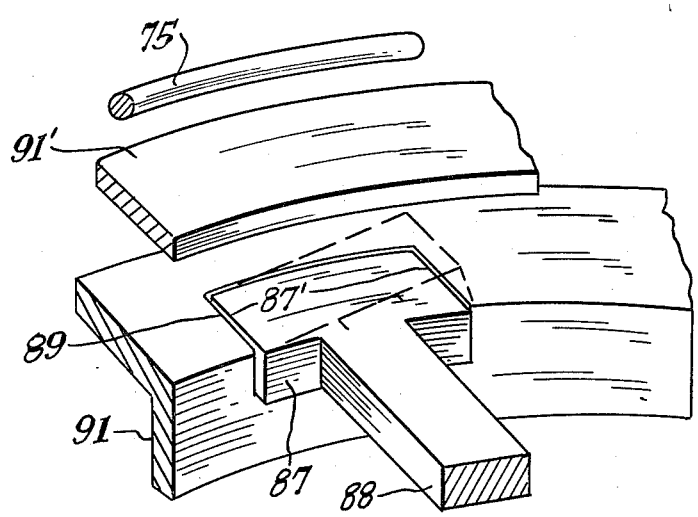
Fig. 6.
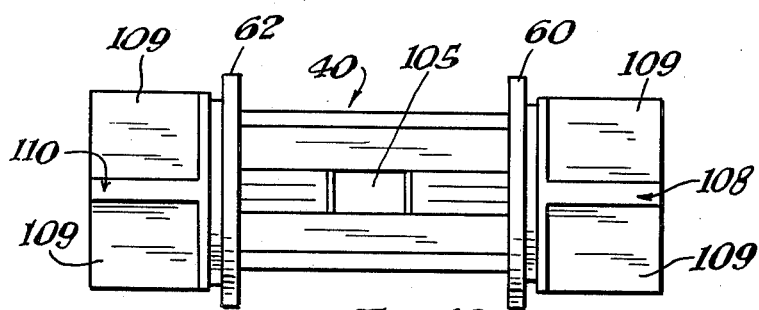
Fig. 10.
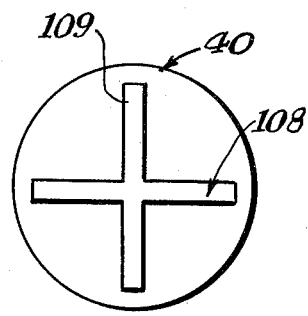
Fig. 11.
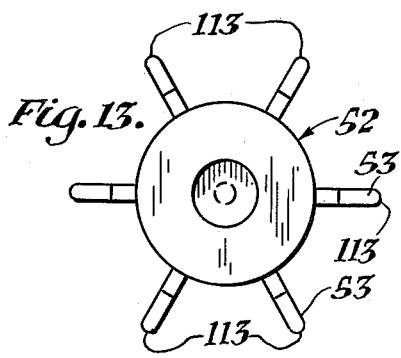
Fig. 13.
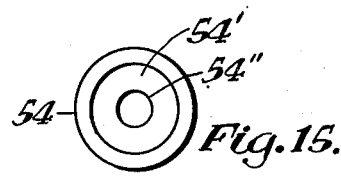
Fig. 15.
Fig. 14.
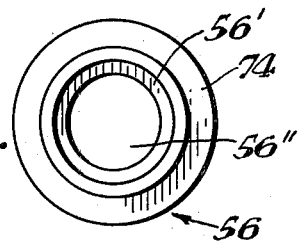
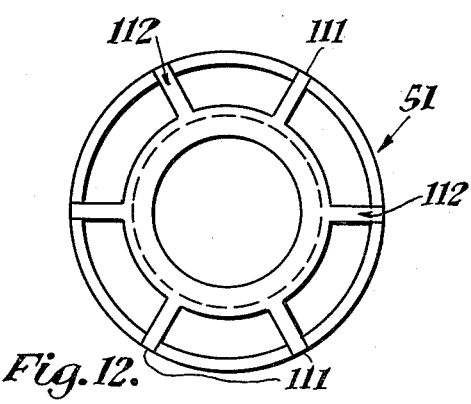
Fig. 12.
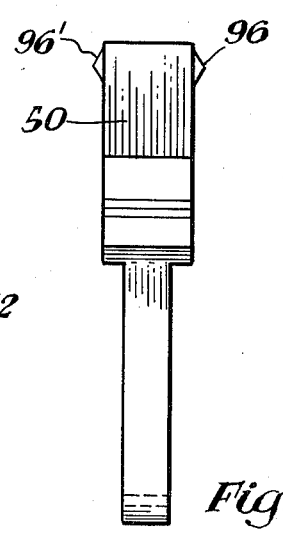
Fig. 7.
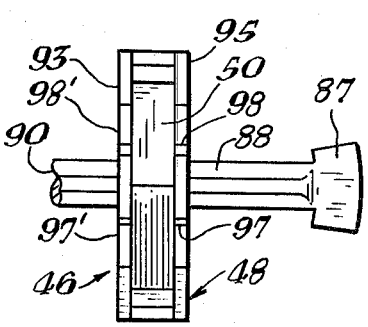
Fig. 16.

DIAPHRAGM VALVE AND VALVE SYSTEM

BACKGROUND OF THE INVENTION

This invention relates to a new and improved automatic two-way valve and an automatic serial distribution system.

In the past valves of various types have been designed for use in distributing systems for irrigation purposes. As is perhaps well-known, many distribution systems have been designed for providing fluid flow output at each terminal end in the distribution systems. The new and improved automatic diaphragm valve and automatic distribution system disclosed herein provides a non-complex, lowcost valve means and an improved cyclic distribution system that serially distributes fluid from a plurality of terminal branches in the system.

BRIEF DESCRIPTION OF THE INVENTION

The present invention relates to a new and improved automatic diaphragm valve including an inlet and two separate outlets for use in a fluid distribution system. The valve includes a cycling mechanism to automatically open both outlets when fluid stops flowing into the inlet and alternately cocks the mechanism in a first or second cocked position for the next half cycle. When the fluid flows into the inlet of the valve and engages the cycling mechanism, the mechanism automatically fully opens one valve and closes the other valve. Alternately the first valve outlet is opened and the second valve outlet is closed; then on the next half cycle the first valve outlet is closed and the second valve outlet is opened. When the mechanism is positively cocked in position the previously closed valve outlet is partially opened and the previously opened valve outlet is partially closed at the end of each half of the cycle of the mechanism.

The valve is connected at each junction in a multi-branching fluid distribution system. The new and improved valve will cause cyclic distribution of fluid from each of the terminal branches of the system in a serial manner. Only the main valve need be actuated on and off to provide the serial distribution.

It is an object of this invention to provide a system of fluid distribution through a plurality of outlet nozzles in a serial manner by solely actuating the main distribution valve.

It is another object of this invention to provide an economic cycling mechanism for providing an output from either a first or second outlet. The cycling mechanism has four operating positions including a first cocked position with the first and second valve partially open and a first actuated position with the first valve opened and the second valve closed, and a second cocked position with the first and second valve open, and a second actuated position with the first valve closed and the second valve opened.

Another object of this invention is to provide a cycling mechanism including a pivotal arm device and a rocker cam mechanism providing four operating positions.

It is another object of this invention to provide a new and improved generally low-cost two-way valve that is automatically actuated by fluid flowing into the inlet.

Another object of this invention is to provide an automatic fluid flow actuated valve that automatically positions the actuating mechanism in positive position to fully open the first or second outlet.

An additional object of this invention is to provide a fluid flow actuated valve that alternately opens and closes the two outlets and places the two outlets in a partially open position when no fluid is flowing into the inlet.

Still a further object of this invention is to provide an automatic fluid flow actuated valve that will actuate under decreased inlet pressure.

Still another object of this invention is to provide a fluid seal between the actuating piston and the inlet pipe.

A further object of this invention is to provide fluid bypass means past the valve seating means to prevent fluid lockup.

In accordance with these and other objects which will be apparent hereinafter, the instant invention will now be described with particular reference to the accompanying drawings illustrating the valve system and the valve.

BRIEF DESCRIPTION OF THE DRAWINGS

In the drawings:

FIG. 3 is a front partial cross sectional view of the valve with the cycling device in a first position after initial entry of a fluid past the drive means with the first, the left hand, valve outlet opened and the second, the right hand, valve outlet closed, and showing the outer member of the drive means in phantom in a fully opened position;

FIG. 4 is a front partial cross sectional view of a portion of the valve with the valve cycling device in a second position with the left hand valve outlet closed and the right hand valve outlet opened.

FIG. 5 is a top view of the valve;

FIG. 6 is a partial isometric view of the cycling device spring means, retainer members, and a portion of the t-connector of the base of the cycling device shown in FIG. 9;

FIG. 7 is a side view of the moveable cam of the cycling device;

FIG. 8 is a front cross sectional view of an embodiment of a single member cycling device;

FIG. 9 is a partial side view of the base of the cycling device with the cam of FIG. 7 in place in a cocked position;

FIG. 10 is a top view of the valve member;

FIG. 11 is a side view of the valve member;

FIG. 12 is a top view of the outer piston member;

FIG. 13 is a top view of the central cap member;

FIG. 14 is a top view of the intermediate member;

FIG. 15 is a top view of the inner drive arm guide member;

FIG. 16 is a top view of the cam member in base of the cycling device as shown in FIG. 9.

DESCRIPTION OF A PREFERRED EMBODIMENT

Figure 1:
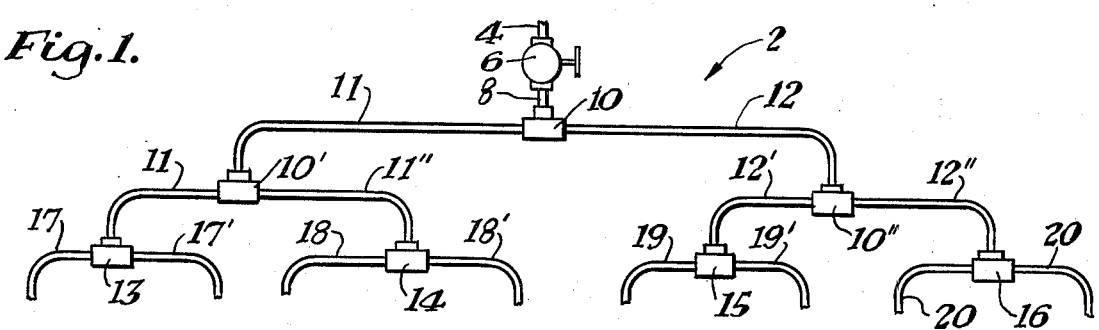
FIG. 1 is a plan view of the fluid distribution system including an automatic valve at each junction.

Referring now in detail to the drawings, wherein the preferred embodiment of the invention is shown and referring particularly to FIG. 1, the valve distribution system, generally designated by numeral 2 includes a main 4 connected to a main inlet valve 6 and a distribution system including a plurality of the new and improved valves. The distribution system may include a line 8 connected to valve 10 which is in turn connected to a branching point of lines 11 and 12. The branching lines 11 and 12 are in turn branched into additional lines through a valve 10' and 10". Each branching line from valves 10' and 10" are designated 11', 11" and 12', 12" respectively. The distribution system may again be branched into additional lines by valves 13, 14, 15 and 16. The terminal lines 17, 17', 18, 18', 19, 19', 20 and 20' distribute fluid for purposes such as, irrigation. Each time the valve 6 is turned on and off the new and improved valves 10, 10', 10", 13, 14, 15 and 16 control the fluid in order to serially distribute fluid out of one of the terminal lines at a time. Upon completion of distribution from each of the terminal lines the cycle will automatically repeat the sequence of distribution from the terminal lines until the on-off actuation of valve 6 is terminated.

Figure 2:
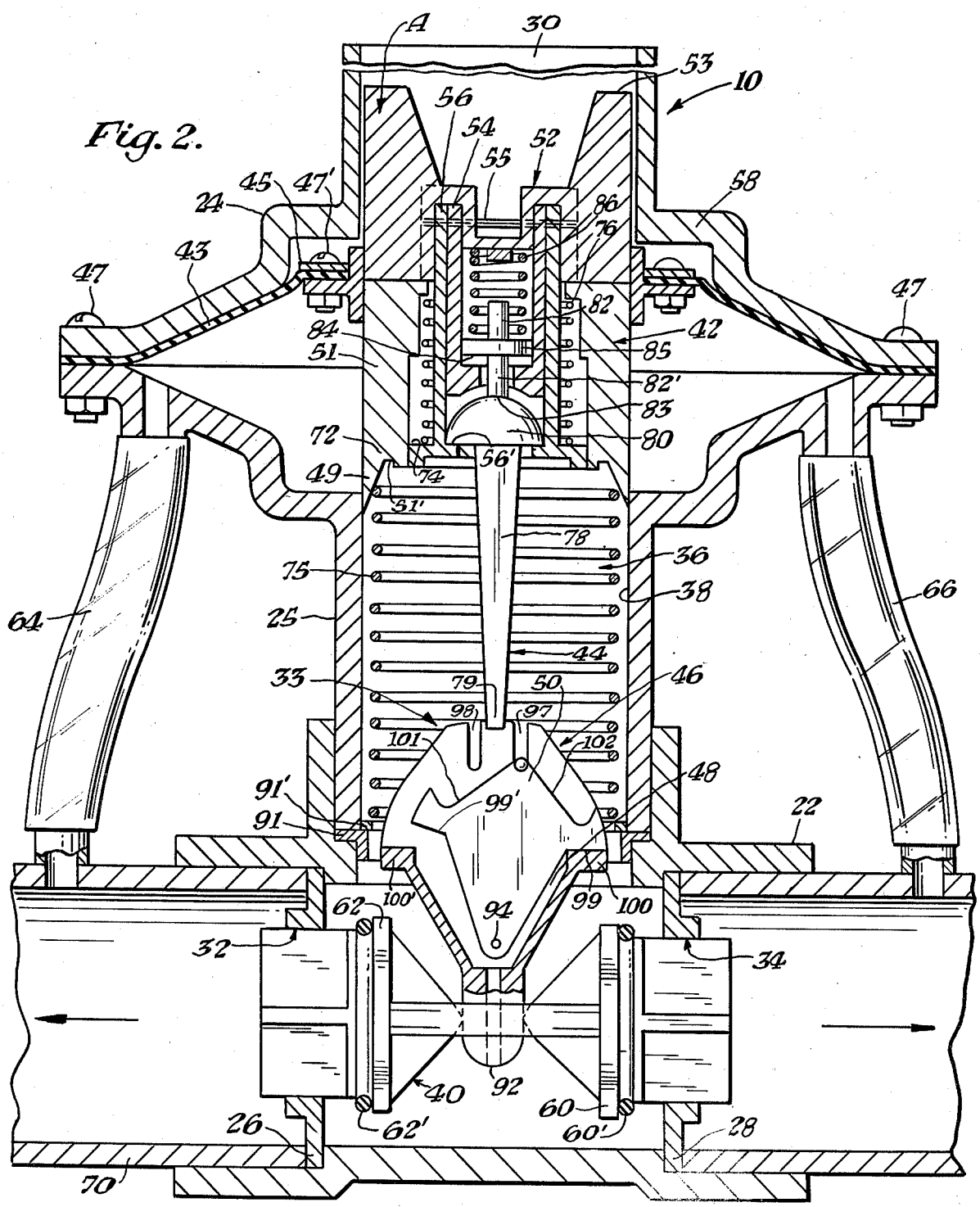
FIG. 2 is a front view cross section of the valve with the device in a neutral position but cocked to the right in the first cocked position with the valve means in a neutral opened position and the drive means in a closed position.

Referring now to FIG. 2 showing a cross-section of the new and improved valve 10, the valve includes body 22 with an upper housing portion 24 and a lower housing portion 25, secured together by fastening means 47. The body 22 includes a first and second outlet wall 26 and 28 respectively. The body 22 has an inlet 30 in the upper housing portion 24 and two outlets 32 and 34 in the walls 26 and 28 respectively. Valve 10 also includes an automatic cycling mechanism generally designated by numeral 36. The cycling mechanism 36 lies between the inlet 30 and the outlets 32 and 34. The cycling mechanism is used to control the inlet fluid distribution by alternately opening and closing the first and second outlet. The cycling mechanism 36 in chamber 38 includes an actuating means or piston mechanism 42, a cycling drive means 33 and a separator means 43. The cycling drive means 33 includes a drive arm 44 and cycling cam means 46. The actuating means 42, a piston mechanism, drive arm 44 into and out of contact with the cycling cam means 46 to actuate the valve gating means 40. The valve gating means includes a right hand valve closure gate 60 with gasket 60' and a left hand closure gate 62 with gasket 62'. The closure gates move into and out of contact with the walls 26 and 28. The valve 10 also includes two bypass means 64 and 66 connected between the lower housing portion 25 and the conduits 68 and 70 downstream of the outlets 34 and 32 to equalize the pressure across the closure gates 60 and 62 to permit movement of the valve gating means 40, when a higher pressure exists on the upstream side of a closed valve closure gate 60 or 62.

The actuating mechanism 42 is normally held in an upper position as shown in FIG. 2 by spring 75. The actuating mechanism 42 includes an outer piston member 51 shown in detail in FIG. 2 and also shown in FIG. 12, and a central cap member 52, also shown in FIG. 13, connected by pin 55 to an inner drive arm guide member 54, also shown in FIG. 15, and an intermediate member 56, as also shown in FIG. 14 and a separator means 43 connected between a clamp ring 45 and the central cap member 52 by a plurality of fastners 47'. The outer piston member 51 is connected to the intermediate member 56 by spring 76 for relative movement. The outer piston member 51 has a spring retainer collar 49 which is extended into said lower housing portion 25 to guide said actuating mechanism 42 during cycling.

When water flows through inlet 30 past the upper guide fins 53, fluid will flow downwardly as shown by arrow A in FIG. 2 against the base 72 of the outer piston member 51 and the surface 74 of the intermediate member 56. The entire actuating member 42 will move from the position shown in FIG. 2 to a lower position as shown in FIG. 3. The actuating mechanism 42 and the central cap member 52 with guide wings fins 53 will be spaced from the inlet 30 and the inlet stop surface 58. After the actuating member 42 reaches the position shown in FIG. 3, that is when the tip 79 of drive arm 44 bottoms in cam surface 101, the outer piston member 51 may move further downward into a position shown in FIG. 4 and in phantom in FIG. 3. As the outer piston member 51 with portion 51' moving down against the force of return spring 75 and with portion 51" moving down against the force of the secondary return spring 76, fluid is allowed to flow past the actuating mechanism 42 and out through one of the outlets 32 and 34.

The inner portion of the actuating mechanism 42 includes a central cap member 52 shown in FIG. 13 with guide portions 53 that engage the inside of the upper housing portion 24. The inner drive arm guide means 54 shown in FIG. 15 includes a spring cavity 54' and a lower opening 54". The intermediate member 56 shown in FIG. 14 includes spring shelf surface 74, centering shelf 56' for arm 44, and opening 56". The members 52, 54 and 56 are held together by pin 55. The bottom of the central cap member 52 with spring positioning member 52' and the inner drive arm guide means 54 form a cavity that holds spring 86 and reciprocating centering member 84. The reciprocating centering member 84 has a cylindrical surface 85 to engage the inner wall of the inner drive arm guide means 54. Projection 82 holds the lower end of spring 86 in place and projection 82' with a concave surface 83 contacts the bulbous end 80 of arm 44. The spring 86 and centering member 84 bias the arm 44 into the position shown in FIG. 2.

The drive arm 44 includes an elongated arm member 78 having an upper bulbous end 80. The actuating arm is normally held in the position shown in FIG. 2 by projection 82' that moves up and down within the opening in the inner drive arm guide means 54. Spring 86 biases the projection 82' downwardly against the bulbous end 80 of the drive arm 44 to seat the edges of the bulbous end 80 on shelf 56'.

The cycling cam means 46 and an alternate cycling cam means 46' shown in FIG. 8 includes a base member 48 shown in FIGS. 9 and 16 and 48' in FIG. 8. Base member 48 includes a relatively moveable cam surface 50. Details of the base member 48 are shown in FIGS. 6, 9 and 16. The relatively moveable cam member 50 is shown in FIGS. 7, 9 and 16. The base member 48 is biased into its neutral position as shown in FIG. 2 by a spring mechanism shown in FIG. 6. The base member includes two support arms 88 and 90 shown in FIG. 9. Each support arm 88 and 90 includes a generally t-shaped end 87 that lies in a notch 89 in the channel ring 91. Lying over the t-shaped end 87 of the base member 48 is a flat ring member 91'. Spring 75 biases the flat ring member 91' against t-shaped end 87. When the base member is rocked back and forth as shown in FIG. 2, 3 and 4, one end of the t-shaped end 87 will tend to rise as shown in phantom in FIG. 6. The spring member 75 will force the ring member 91' to reposition the t-shaped member of the base member 48 in a neutral position as shown in FIG. 2. Spring 75 will impart a force against one edge of the t-shaped end 87 as shown in FIG. 6 to force the arm 88 and arm 90 into its neutral position shown in FIG. 2.

The cam means 50 shown in FIGS. 7, 9 and 16 is pivotally connected within the forward and rearward walls 93 and 95 of the base member 48. The cam means 50 is pivoted about pin 94. The cam means 50 is positioned in either of two positions shown in FIGS. 3 and 4 with the holding means 96 and 96', a bulbous holding means in slots 97, 97', 98 or 98'. Identical slots are in walls 93 and 95 as shown in FIG. 16. The cam means 50 may be placed in a right-hand position as shown in FIG. 4 or in a left-hand position as shown in FIG. 3 when the holding means 96 and 96' is placed in the slots 97, 97', 98 or 98' respectively.

When the cam means is in the right-hand position as shown in FIGS. 2 and 4, the base surface 99 is in contact with the shelf 100 of the base member. When the cam means is in its left-hand position as shown in FIG. 3, the supporting surface 99' is in contact with the shelf means 100'.

Referring to FIG. 2, when the cam means 50 is in its right-hand position and water begins to flow through the inlet 30 as shown by arrow A, the actuating means 42 and separator means 43 will move into position shown in FIG. 3, driving the arm 44 down the cam surface 101 of the cam means 50 moving the cam means into its left-hand position and thereafter rotating the base member 48 and its t-shaped ends 87, one of which is not shown, against the spring biasing means 75 to drive the valve means 40 into the position shown in FIG. 3 and to secure flow through the bypass means 64 and 66 by the separator means 43. In FIG. 3 opening 34 is closed by the valve means 40 and outlet 32 is open and bypass means 64 and 66 are closed by separator means 43 to prevent short cycling the outlet fluid through the bypass means 64 and 66 back to the inlet 30. When the water stops flowing in inlet 30, the actuating mechanism 42, the separator means 43, the arm 44, the cycling cam means 46 and the valve means 40 move back to a neutral position as shown in FIG. 2.

The next half-cycle begins when water is again allowed into the inlet 30. The water moves actuating mechanism 42 and separator means 43 downward to move the arm 44 down against the cam surface 102. The arm 44 moves the cam member 50 into its right-hand position and to rotate the base member 48 to drive the valve means 40 to close the outlet 32. The distal end of the base 92 fits into slot 105 in the valve means 40, see FIGS. 2, 10 and 11. Since base member 48 rotates 92 on the arm 88 and 90 it will drive the valve means 40 from a neutral position to the right or to the left in order to alternately open and close the outlets 32 and 34.

The valve means 40 includes circular plates 60 and 62 for closing the outlets 32 and 34. Extending out beyond the plates are guide means designated by numerals 108 and 110, with guide surfaces designated by numeral 109 for positioning and guiding the valve means in relationship to the outlet wall 26 and 28.

The actuating means 42 includes the outer piston means 51 shown in FIGS. 2 and 12 with six guide means 112 having guide surfaces designated by numeral 111 for guiding engagement with the inner surface of lower housing portion 25. The guide surfaces 111 guide the movement of the outer piston means 51 as it reciprocates in the lower housing of portion 25. The central cap member 52 also includes six guide members 53 having guide surfaces designated by numeral 113, also see FIG. 13. The guiding surfaces 113 engage the inside surface wall of upper housing portion 24.

An alternate cycling cam means 48' or cycling drive means having a single member is shown in FIG. 8. The alternate cycling mechanism 48' has a valve actuating end 92', cam surfaces 101' and 102' and with a forward and aft support arm as illustrated by dotted lines marked 88'. Arms 88' are similar to arms 88 and 90 of base member 48. This mechanism would be driven by the drive arm 44 to actuate the valve means. This cycling cam means 48' is placed in a cocked position, off center by spring 75 and member 91'. The edges 87' and 87" of the shaped end 87 are cut or shaved, not shown, so that the cycling cam means would not be completely returned to an upright neutral position, as cycling cam means or cycling drive means 46 in FIG. 2. Therefore the drive arm 44 will engage the opposite cam surface 101' or 102' upon the next half cycle.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An automatic valve comprising:
   a body having an upper and lower portion, said upper portion having a fluid inlet for receiving incoming fluid,
   two separate fluid outlets in said lower portion fluidly connected to said fluid inlet for alternately distributing said fluid to outlet conduits,
   an intermediate portion connecting said fluid inlet to said fluid outlets,
   two separate hydraulic by-pass means including an aperture disposed through said lower portion, an aperture disposed through said outlet conduits and a conduit means connecting said apertures for fluidly connecting said intermediate portion to said outlet conduits downstream of said fluid outlets for the equalization of pressure between said intermediate portion and said outlet conduits,
   a valve gating means movably connected to each of said fluid outlets for alternate engagement with said outlets for securing flow through said alternate fluid outlets, and
   a cycling mechanism movably connected in said intermediate portion for distributing said incoming fluid out alternate fluid outlets and including,
   a diaphragm separator means movable in said intermediate portion for sealing said aperture in said lower body portion flexibly connected to said body between said upper portion and said lower portion and movably responsive to fluid pressure of said incoming fluid for moving said diaphragm separator means to a first position to seal said aperture of said hydraulic by-pass means disposed through said lower portion, thereby preventing fluid from flowing through said by-pass means when fluid is flowing through said fluid inlet,
   an actuating means for passing said inlet fluid from said upper body portion to said lower body portion movably connected to said diaphragm separator means responsive to movement of said diaphragm separator for passing said incoming fluid through said intermediate portion when said diaphragm separator means is in said first position while preventing fluid from flowing through said by-pass means , and a cycling drive means for alternately moving said valve gating means into contact with said fluid outlets having a drive arm driven by and connected to said actuating means at a first end and a cam means having a base member for receiving a second end of said drive arm for imparting alternate motion to said cam means for alternately moving said valve gating means into and out of contact with said fluid outlets to allow alternate fluid flow to said outlet conduits.

2. An automatic valve as set forth in claim 1, wherein:

said diaphragm separator means is connected in said body between said upper portion and said lower portion adjacent said aperture disposed through said lower portion whereby said cycling drive means is positioned in a normally neutral position with said fluid outlets open, said diaphragm separator means is movable to close said hydraulic by-pass means to prevent fluid from flowing in said hydraulic by-pass means when said valve gating means is moved to a closed contact with one of said fluid outlets by said cycling drive means moving from said neutral position by movement of said diaphragm separator means to said first position, said valve gating means movable to alternately open one fluid outlet and close the other fluid outlet during a first half cycle, and to close the one fluid outlet and open the other fluid outlet during a second half cycle, said diaphragm separator means driven in said first direction toward closing said by-pass means and aiding in moving said cycling mechanism means when responding to fluid entering said inlet, said diaphragm separator means closing said by-pass means at the completion of the first half cycle and the completion of the second half cycle, said actuating means including piston means for reciprocation by said incoming fluid driven in a first direction by the fluid entering said inlet, said piston means reciprocally movable from a first position within said fluid inlet to another position to drive said cycling drive means, said piston means including a biasing means to return said piston to its first position whereby said valve gating means is moved to a neutral position by said cycling drive means when insufficient fluid is flowing in said inlet, said cycling drive means connected to said gating valve means to alternately open one outlet and close the other outlet and thereafter close said one outlet and open said other outlet, said cycling drive means includes a cockable device connected to said actuating means positionable in a first cocked position during the first half-cycle to move said valve gating means from a neutral position to a first position with one of said outlets open and the other outlet closed upon entry of the fluid in said inlet and to return said valve means to a neutral position with both said outlets open when the fluid no longer flows through said inlet and to cock said cockable device in a second position for moving said gating valve means during the second half-cycle from the neutral position to a second position with said one of said outlets closed and said other outlet open when fluid again flows through said inlet, and for returning said valve gating means to the neutral position when insufficient fluid flows through said inlet, said drive arm contacting said cam means to drive said base member for driving said valve gating means from a neutral position to open one outlet and close the other outlet and to cock said cam means into another position to again receive said drive arm from the neutral position to drive said base member during the next cycle, said base member including a biasing means to move said base member and said valve gating means back into a neutral position.

3. An automatic valve as set forth in claim 2, wherein:

said diaphragm separator means movably connected to said actuating means responsive to fluid pressure of said incoming fluid seals said aperture disposed through said lower portion and closes said hydraulic by-pass means to fluid flow when each of said fluid outlets are alternately engaged by said gating means.

* * * * *